United States Patent [19]
Carlson

[11] Patent Number: 5,859,853
[45] Date of Patent: Jan. 12, 1999

[54] ADAPTIVE PACKET TRAINING

[75] Inventor: David Glenn Carlson, Rochester, Minn.

[73] Assignee: International Business Machines Corporation, Armonk, N.Y.

[21] Appl. No.: 670,795

[22] Filed: Jun. 21, 1996

[51] Int. Cl.$^6$ ........................................... H04J 3/16
[52] U.S. Cl. ...................... 370/468; 370/470; 370/473
[58] Field of Search .................... 375/231, 232, 375/222, 260, 242; 370/241, 470, 463, 465, 229, 230, 231, 232, 233, 234, 236, 235, 237, 238, 468, 472, 473, 471, 252, 253

[56] References Cited

U.S. PATENT DOCUMENTS

| | | | |
|---|---|---|---|
| 4,517,641 | 5/1985 | Pinheiro | 364/200 |
| 4,736,369 | 4/1988 | Barzilai et al. | 370/94 |
| 4,805,167 | 2/1989 | Leslie et al. | 370/84 |
| 4,979,184 | 12/1990 | Bottoms et al. | 375/231 |
| 5,040,176 | 8/1991 | Barzilai et al. | 370/94.1 |
| 5,063,562 | 11/1991 | Barzilai et al. | 370/94.1 |
| 5,127,051 | 6/1992 | Chan et al. | 375/231 |
| 5,166,930 | 11/1992 | Braff et al. | 370/94.1 |
| 5,179,660 | 1/1993 | Devany et al. | 395/200 |
| 5,199,028 | 3/1993 | Arnold | 370/60 |
| 5,260,942 | 11/1993 | Auerbach et al. | 370/94.1 |
| 5,285,442 | 2/1994 | Iwamura et al. | 370/17 |
| 5,400,328 | 3/1995 | Burren et al. | 370/79 |
| 5,402,416 | 3/1995 | Ciesiak et al. . | |
| 5,537,438 | 7/1996 | Mourot et al. | 375/231 |
| 5,566,208 | 10/1996 | Balakrishman | 375/240 |
| 5,606,580 | 2/1997 | Mourot et al. | 375/231 |

FOREIGN PATENT DOCUMENTS

| | | | |
|---|---|---|---|
| 7066837 | 3/1995 | Japan | H04L 12/56 |

OTHER PUBLICATIONS

Article entitled "Efficicent data transmission in remote operation system by intentional transmission delay," IBM Technical Disclosure Bulletin, vol. 37, No. 8, Aug. 1994.

"TCP Vegas: New Techniques for Congestion Detection and Avoidance", Lawrence S. Brakmo, Sean W. O'Malley, and Larry L. Peterson, Dept. of Computer Science, Univ.of Arizona, Tucson, AZ 85721, pp. 24–35.

"Delay Analysis For Packet Trains Over Computer Communication Networks", Ihab A. Jacobs, and Eric B. Hall, Dept. of Electrical Engineering, Southern Methodist University, Dallas, Texas 75275, pp. 13–7 –13–14.

Patent Application Ser. No. 08/283,889, Filed Aug. 1, 1994, "Method and Apparatus For Grouping Packets Using Timed Windows", Brad L. Brech, Gary S. Delp and Albert A. Slane.

Patent Appliction Ser. No. 08/472,368,368, filed Jun. 7, 1995, "Method And System For Enhanced Communication In A Multisession Packet Based Communiction System", Gary S. Delp and Albert A. Slane.

*Primary Examiner*—Huy D. Vu
*Attorney, Agent, or Firm*—Owen J. Gamon

[57] ABSTRACT

A mechanism that dynamically adjusts the number of packets sent in the train from a node to reflect the rate of packets arriving at the node. A train is a group of packets that are sent from the node as one unit. The node has an optimum train length that the node would like to send. The node also has a timer interval, which is the maximum time to wait before sending the next train. If the timer interval expires and the number of packets accumulated in the train is less than the optimum train length, then the node transmits the train and sets the optimum train length to be the number of packets actually received; that is, the optimum train length is adjusted downward. If the number of packets accumulated equals the optimum train length and the timer interval has not yet expired, the receiving node transmits these packets in a train, and if the next packet arrives before the time that the timer would have expired, the node increases the optimum train length.

18 Claims, 11 Drawing Sheets

ADAPTIVE PACKET TRAINING

FIELD OF THE INVENTION

This invention relates to the data processing field. More particularly, this invention relates to a method and apparatus for adaptively transmitting data packets in a train.

BACKGROUND

Computer networks that facilitate data processing are becoming increasingly common in the modern world. Such networks include multiple nodes, which are typically computers, that may be distributed over vast geographic distances and connected by communications links, such as telephone wires. Each node typically includes a processing element, which processes data, and a communications control unit, which controls the transmission and reception of data in the network across the communications link. The processing element can include one or more processors and memory.

Nodes communicate with each other using packets, which are the basic units of information transfer. A packet contains data surrounded by control and routing information supplied by the various nodes in the network. A message from one node to another may be sent via a single packet, or the node can break the message up into several shorter packets with each packet containing a portion of the message. The communications control unit at a node receives a packet from the communications link and sends the packet to the node's processing element for processing. Likewise, a node's processing element sends a packet to the node's communications control unit, which transmits the packet across the network.

All of this sending, receiving, and processing of packets has an overhead, or cost, associated with it. That is, it takes time to receive a packet at a node, to examine the packet's control information, and to determine what to do next with the packet. One way to reduce the packet overhead is a method that transmits packets in a train, called packet training. This packet training method consolidates individual packets into a group, called a train, which reduces the overhead when compared to processing the same number of packets individually because a node can process the entire train of packets at a single time. The word "train" comes from a train of railroad cars. It is less expensive to form a train of railroad cars pulled by a single locomotive than it is to give each railroad car its own locomotive. Analogously, processing a train of packets has less overhead than processing each packet individually.

In a typical training method, a node will accumulate packets until the train reaches a fixed target length. Then the node will process or retransmit the entire train at once. In order to ensure that the accumulated packets are eventually handled since the packet arrival rate at the node is unpredictable, the method will typically start a timer when node receives the first packet in the train. When the timer expires, the node will conclude the train and process it, even if train has not reached its target length.

This method works well in times of heavy packet traffic because the timer never expires. But in times of light packet traffic, the packets that the node does receive experience poor performance while waiting in vain for additional packets to accumulate, and the ultimate timer expiration introduces additional processing overhead.

Thus, there is a need for a packet training mechanism that will overcome the disadvantages of the prior all and provide improved performance even in times of a light, variable, or unpredictable packet traffic rate.

SUMMARY OF THE INVENTION

It is an object of the present invention to provide an enhanced packet training mechanism that provides improved performance.

It is an object of the present invention to provide an enhanced packet training mechanism that reduces the incidence of timer expiration, even in times of light packet traffic.

It is an object of the present invention to provide an enhanced packet training mechanism that dynamically adjusts the packet train length to track the packet traffic arrival rate.

These and other objects arc achieved by a mechanism that dynamically adjusts the number of packets sent in the train from a node to reflect the rate of packets arriving at the node. The node has an optimum train length that the node would like to send. The node also has a timer interval, which is the maximum time to wait before sending the next train. If the timer interval expires and the number of packets accumulated in the train is less than the optimum train length, then the node transmits the train and sets the optimum train length to be the number of packets actually received; that is, the optimum train length is adjusted downward. If the number of packets accumulated equals the optimum train length and the timer interval has not yet expired, the receiving node transmits these packets in a train, and if the next packet arrives before the time that the timer would have expired, the node increases the optimum train length. The node could be associated with a processor within a network of processors in a multi-processor system, or the node could be a computer system interconnected to other computer systems via communication links.

DESCRIPTION OF THE PREFERRED EMBODIMENT

In the preferred embodiment, a node in a network adjusts the number of packets sent in the train from the node to reflect the rate of packets arriving at the node. The node has an optimum train length that the node would like to send. The node also has a timer interval, which is the maximum time to wait before sending the next train. If the timer interval expires and the number of packets accumulated in the train is less than the optimum train length, then the node transmits the train and sets the optimum train length to be the number of packets actually received; that is, the optimum train length is adjusted downward. If the number of packets accumulated equals the optimum train length and the timer interval has not yet expired, the receiving node transmits these packets in a train, and if the next packet arrives before the time that the timer would have expired, the node increases the optimum train length. The network could have computer systems as its nodes, or the network could have processors in a multi-processor system as its nodes, or the network could be a combination of processors and computer systems.

Figure 1:
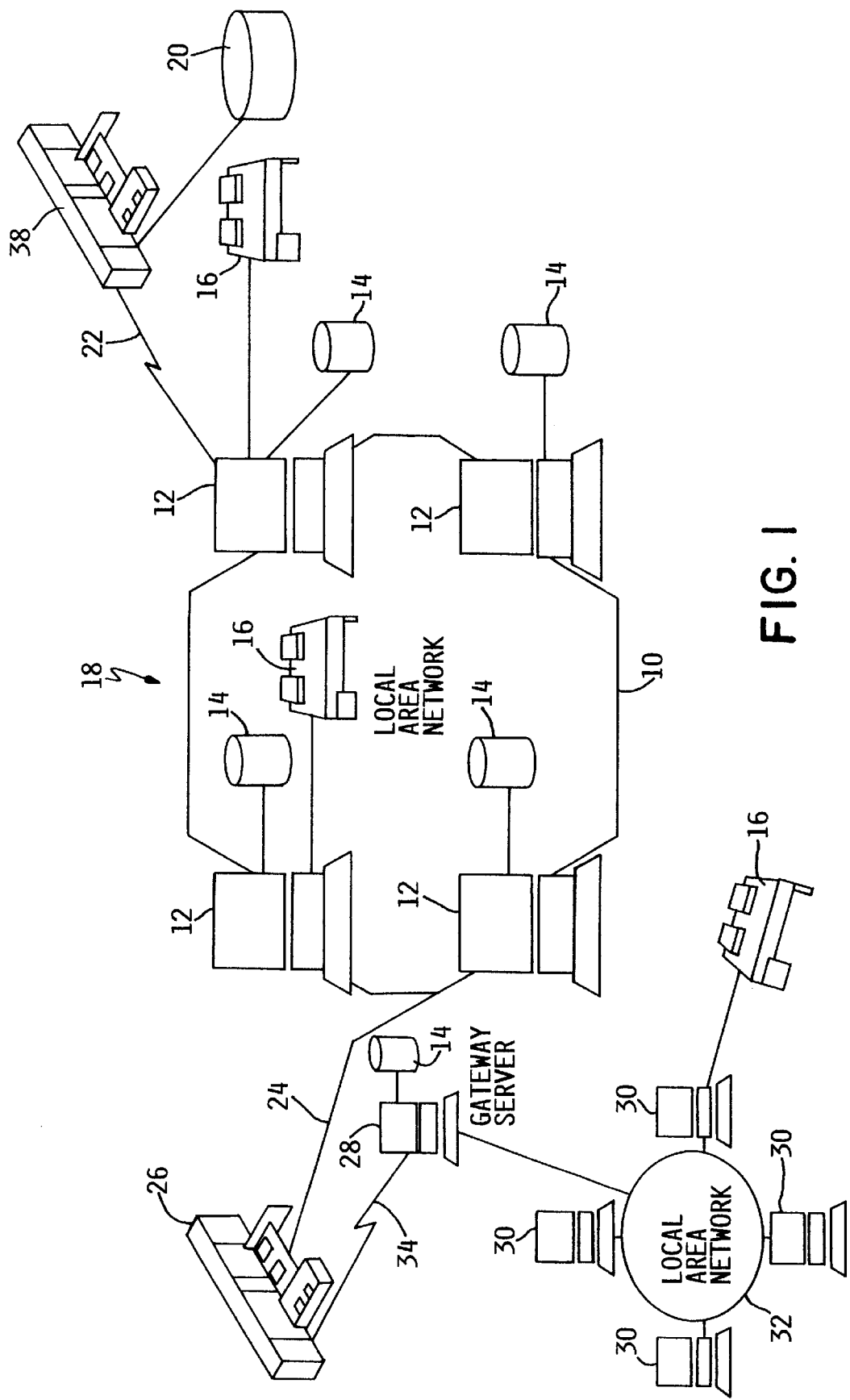
FIG. 1 depicts block diagram of a network of exemplary data processing systems that may be used to implement a preferred embodiment.

With reference now to the figures, and in particular with reference to FIG. 1, a pictorial representation of a network 18, which may be utilized to implement a method and apparatus of a preferred embodiment is depicted. Network 18 may include a plurality of networks, such as local area networks (LAN) 10 and 32, each of which includes a plurality of individual computers 12 and 30, respectively. Computers 12 and 30 may be implemented utilizing any suitable computer, such as the PS/2 computer or an RISC System/6000 computer, both products of IBM Corporation, located in Armonk, N.Y. "PS/2" and "RISC System/6000" are trademarks of IBM Corporation. A plurality of intelligent work stations (IWS) coupled to a host processor may also be utilized in such a network.

Each individual computer may be coupled to a storage device 14 and/or an output device 16, such as a printer. One or more storage devices 14 may be utilized to store documents or resource objects that may be periodically accessed by an user within network 18. In a manner well known in the prior art, each such document or resource object stored within storage device 14 may be freely interchanged throughout network 18 by, for example, transferring a document to a user at an individual computer 12 or 30.

Network 18 also may include mainframe computers, such as mainframe computer 38, which may be coupled to LAN 10 by means of communications link 22. Mainframe computer 38 may be implemented by utilizing an ESA/370 computer, an ESA/390 computer, or an AS/400 computer available from IBM Corporation. "ESA/370", "ESA/390", and "AS/400" are trademarks of IBM Corporation. Mainframe computer 38 may also be coupled to storage device 20, which may serve as remote storage for LAN 10. Similarly, LAN 10 may be coupled via communications link 24 through a subsystem control unit/communications controller 26 and communications link 34 to gateway server 28. Gateway server 28 is preferably an individual computer or IWS that serves to link LAN 32 to LAN 10.

As discussed above with respect to LAN 32 and LAN 10, a plurality of documents or resource objects may be stored within storage device 20 and controlled by mainframe computer 38, as resource manger or library service for the resource objects thus stored. Mainframe computer 38 could be located a great geographic distance from LAN 10 and similarly, LAN 10 may be located a great distance from LAN 32. For example, LAN 32 might be located in California while LAN 10 might be located in Texas, and mainframe computer 38 might be located in New York.

Electronic mail, files, documents, and other information may be sent as packets between any nodes in network 18, such as individual computers 12 and 30, gateway server 28, or mainframe computer 38 through various communication links. A node is a device with which a user can access network 18. A node may be the original source of a packet, an intermediate node in the network through which the packet passes, or the ultimate destination of the packet.

Figure 2:
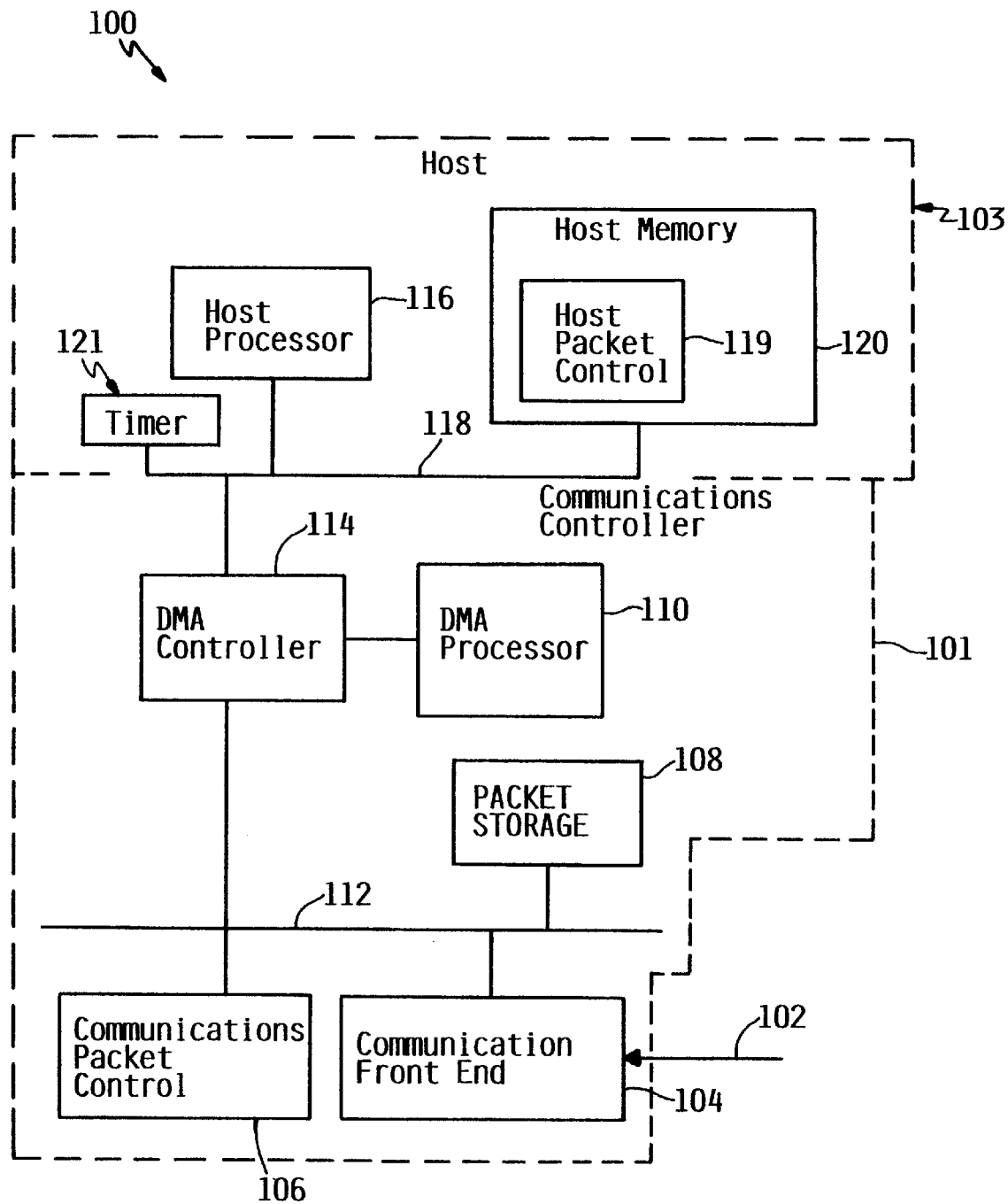
FIG. 2 depicts a schematic representation of a system that trains packets, in accordance with a preferred embodiment.

Referring to FIG. 2, a schematic representation of system 100 is shown, which may be used for training packets under a preferred embodiment of the present invention. System 100 could be implemented at any of computers 12 or 30, gateway server 28, subsystem control unit 26, or mainframe computer 38. System 100 can contain both hardware and software.

System 100 contains communications controller 101 connected to host 103 via system bus 118. System 100 is connected to network 18 of FIG. 1 via communications link 102. Communications link 102 could be any of LAN 10 or 32 or communications link 22, 24, or 34 as described in FIG. 1.

Host 103 contains host processor 116, host memory 120, and timer 121 connected via system bus 118. Host memory 120 is a random access memory sufficiently large to hold the necessary programming and data structures. While host memory 120 is shown as a single entity, it should be understood that memory 120 may in fact comprise a plurality of modules, and that memory may exist at multiple levels, from high-speed registers and caches to lower speed but larger DRAM chips. The contents of host memory 120 can be loaded and stored from and to host processor 116's secondary storage, such as storage devices 14 or 20 of FIG. 1., as needed.

Host memory 120 contains host packet control 119, which contains instructions capable of being executed by host processor 116. In the alternative, host packet control 119 could be implemented by control circuitry through the use of logic gates, programmable logic devices, or other hardware components in lieu of a processor-based system. The operation of host packet control 119 is further described under the description of FIGS. 5, 6, 7, and 8.

Referring again to FIG. 2, communications controller 101 contains communications front end 104, communications packet control 106, packet storage 108, and DMA (Direct Memory Access) controller 114, all connected via communications bus 112. DMA controller 114 is connected to DMA processor 110.

Communications front end 104 is connected to communications link 102 and contains the circuitry for transmitting and receiving packets across communications link 102 and is employed to communicate with other nodes in network 18.

When a packet is received by communications controller 101 from communications link 102, the packet is examined by communications packet control 106 and stored in packet storage 108 before being sent to DMA processor 110. DMA processor 110 controls DMA controller 114. DMA controller 114 receives packets from communications bus 112 and sends the packets to host processor 116 through system bus 118. The packets then are processed by host packet control 119 and stored in host memory 120. When host processor 116 desires to send packets to network 18, it transmits the packets from host memory 120 to packet storage 108 using DMA controller 114 and DMA processor 110. Communications packet control 106 then uses communications front end 104 to transmit the packets from packet storage 108 across communications link 102 to network 18.

Figure 3:
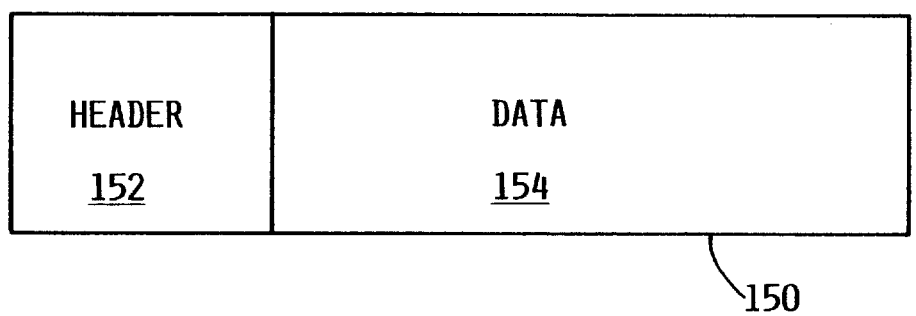
FIG. 3 depicts a data structure of an example packet, in accordance with a preferred embodiment.

Referring to FIG. 3, the data structure for packet 150 is depicted, which includes header 152 and data section 154. Header section 152 contains control information that encapsulates data 154. For example, header section 152 might contain protocol, session, source, or destination information used for routing packet 150 through network 18. Data section 154 could contain electronic mail, files, documents, or any other information desired to be communicated through network 18. Data section 154 could also contain another entire packet, including header and data sections.

Figure 4:
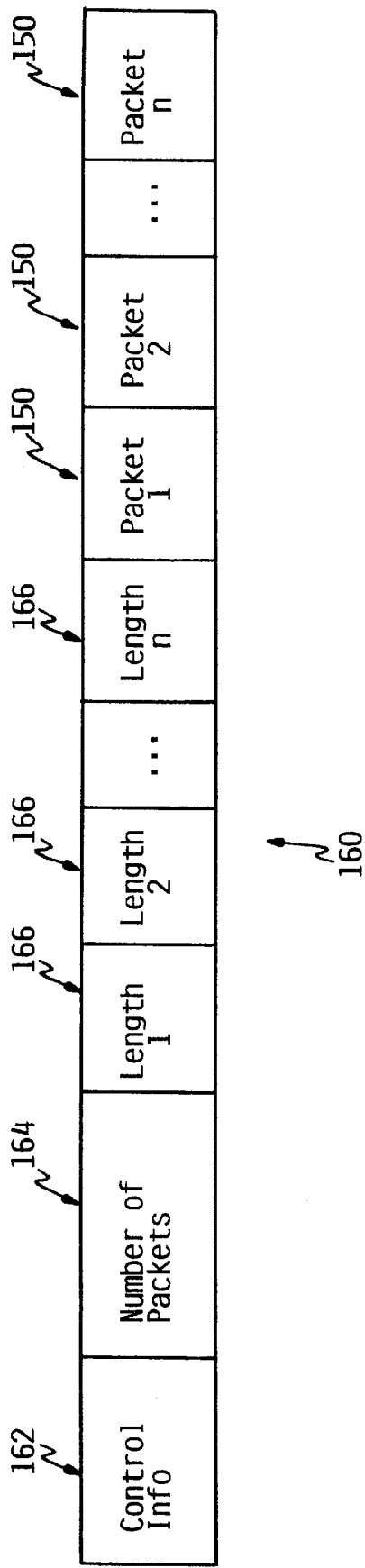
FIG. 4 depicts a data structure of an example packet train, in accordance with a preferred embodiment.

Referring to FIG. 4, a data structure example of packet train 160, according to the preferred embodiment is depicted. Packet train 160 contains control information 162, number of packets 164, length to lengthn 166, and packet1 to packetn 150. Control information 162 can specify, among other things, that the information that follows is part of a packet train. Number of packets 164 indicates how many packets are in the train. In this example, there are "n" packets in the train. Length1 to lengthn are the lengths of packet1 to packetn, respectively. Each of packet1 to packetn 150 can contain header and data, as shown in FIG. 3. Packet train 160 is transferred between nodes as one unit.

The operation of the preferred embodiment, as shown in the flowcharts of FIGS. 5–8, will now be described in more detail. Although packet training will be described under the description of FIGS. 5, 6, 7, and 8 as being performed by host packet control 119 in host 103 (acting as a node) as packets arrive from communications controller 101 (acting as a node), it should be understood that packet training can also be performed by communications packet control 106 as packets arrive from communications link 102 before being transmitted to host 103.

Figure 5:
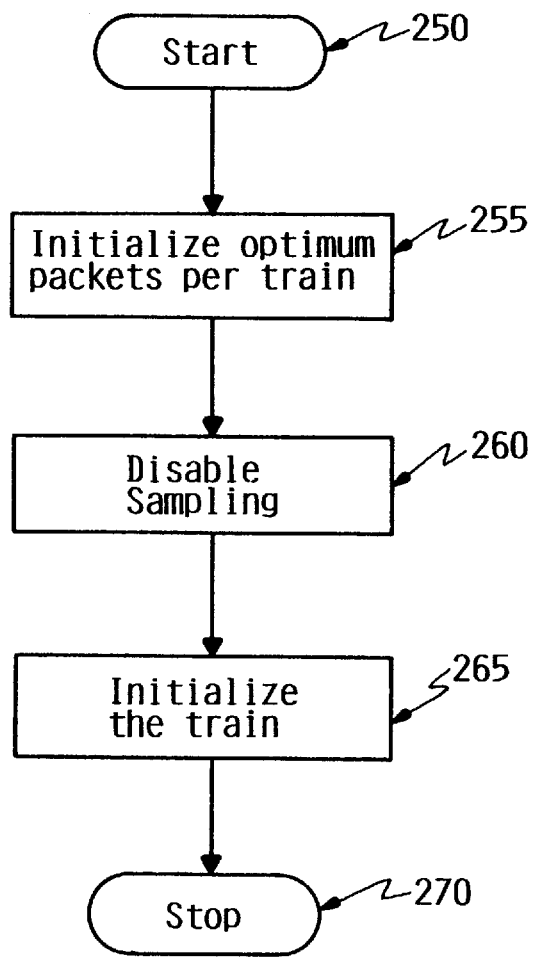
FIGS. 5, 6, 7, and 8 depict flowcharts that describe the operation of a preferred embodiment.

Referring to FIG. 5, the initialization logic for host packet control 119 is shown. This logic is invoked, for example, when host 103 is powered on.

At block 250, the initialization logic is entered. At block 255, host packet control 119 initializes the optimum packets per train. In the preferred embodiment, the optimum packets per train is initialized to be the maximum packets per train minus 1, which tunes the packet training mechanism to use maximum throughput as the initial goal. An alternative embodiment would be to initialize the optimum packets per train to be 1 or to be the minimum packets per train, which would tune the packet training mechanism to use response time as the initial goal. At block 260 host packet control disables sampling. At block 265, host packet control 119 initializes the train to be ready for the first received packet. At block 270, initialization ends.

Figure 6A:
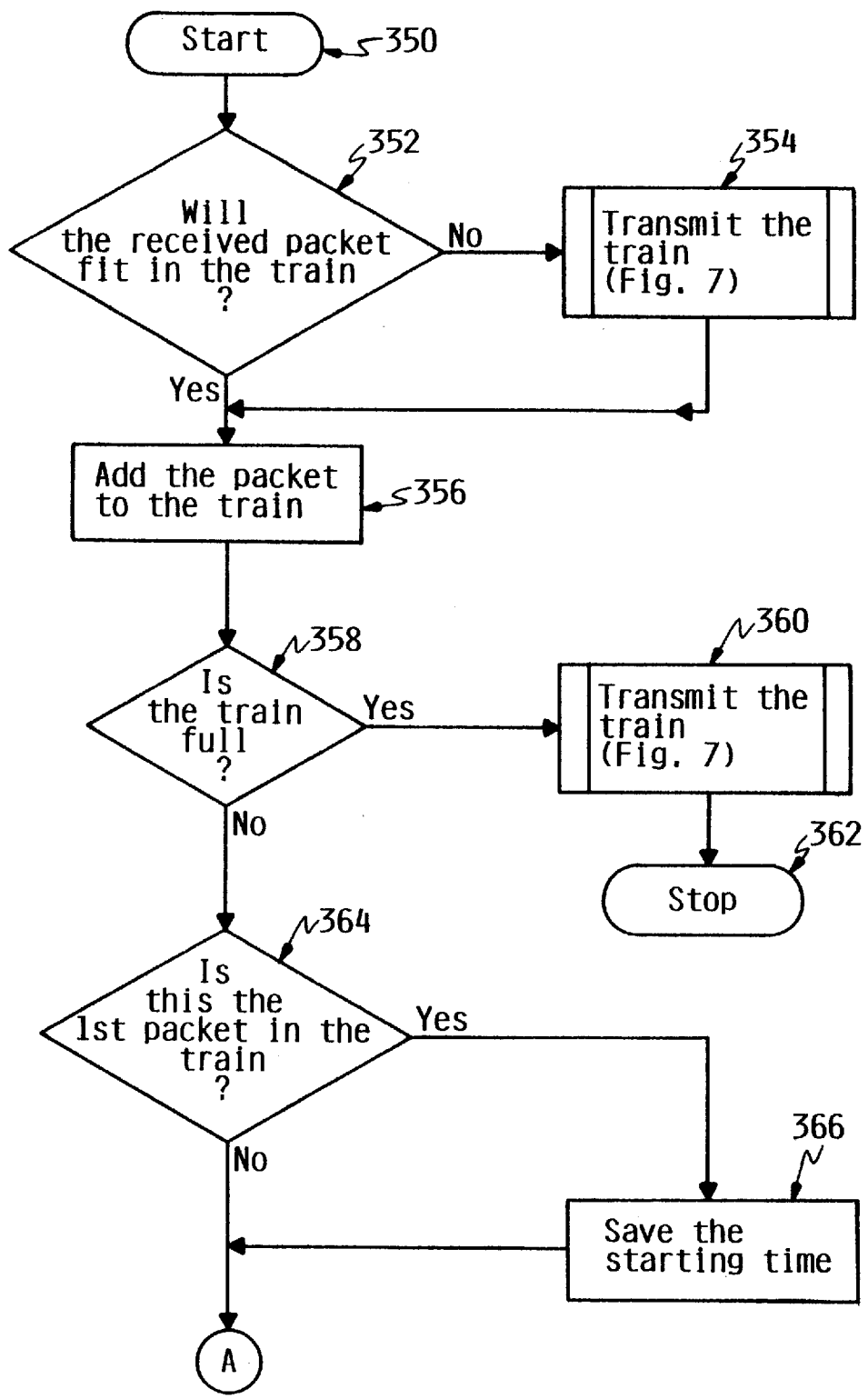
Figure 6B:
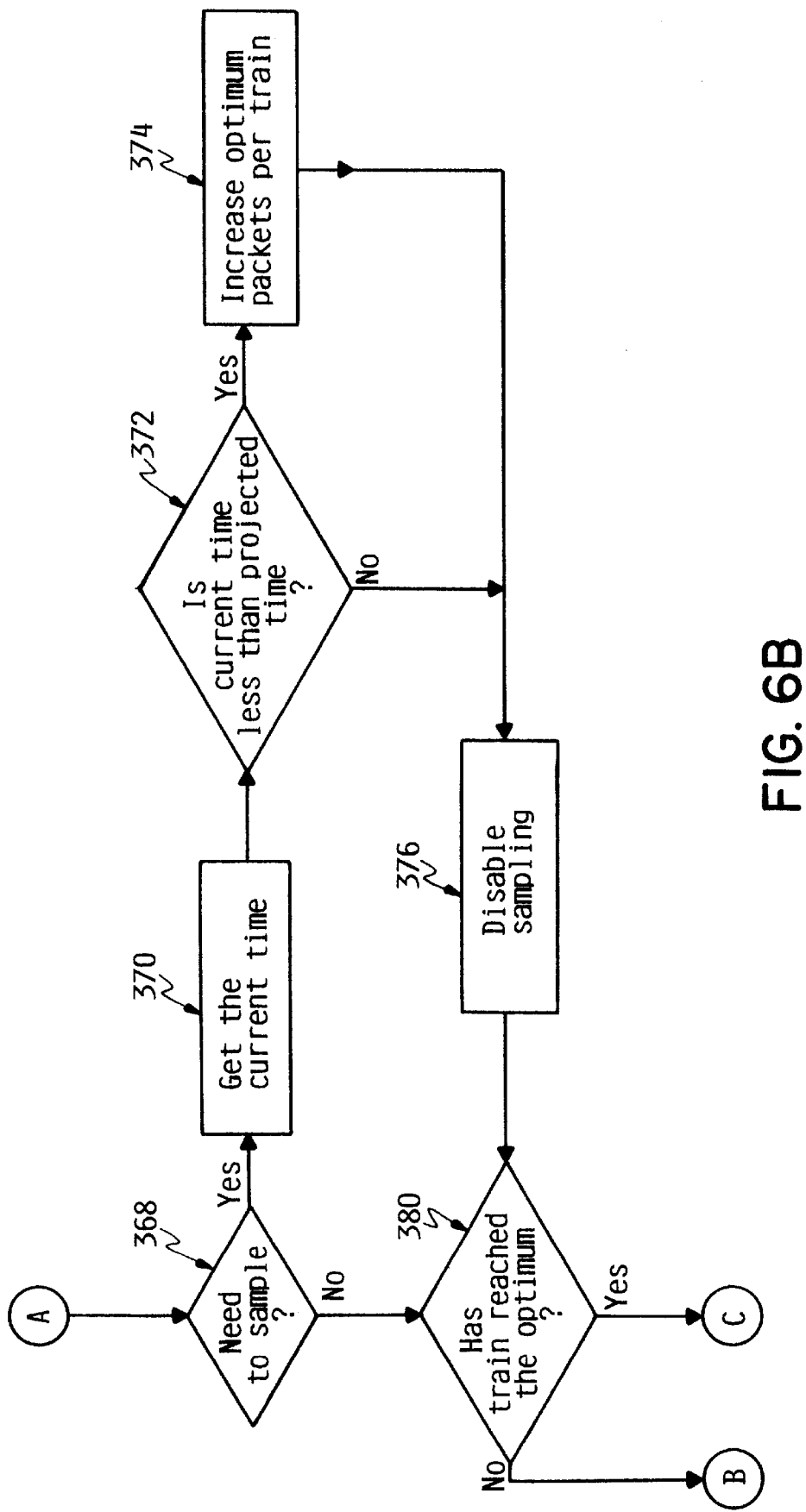
Figure 6C:
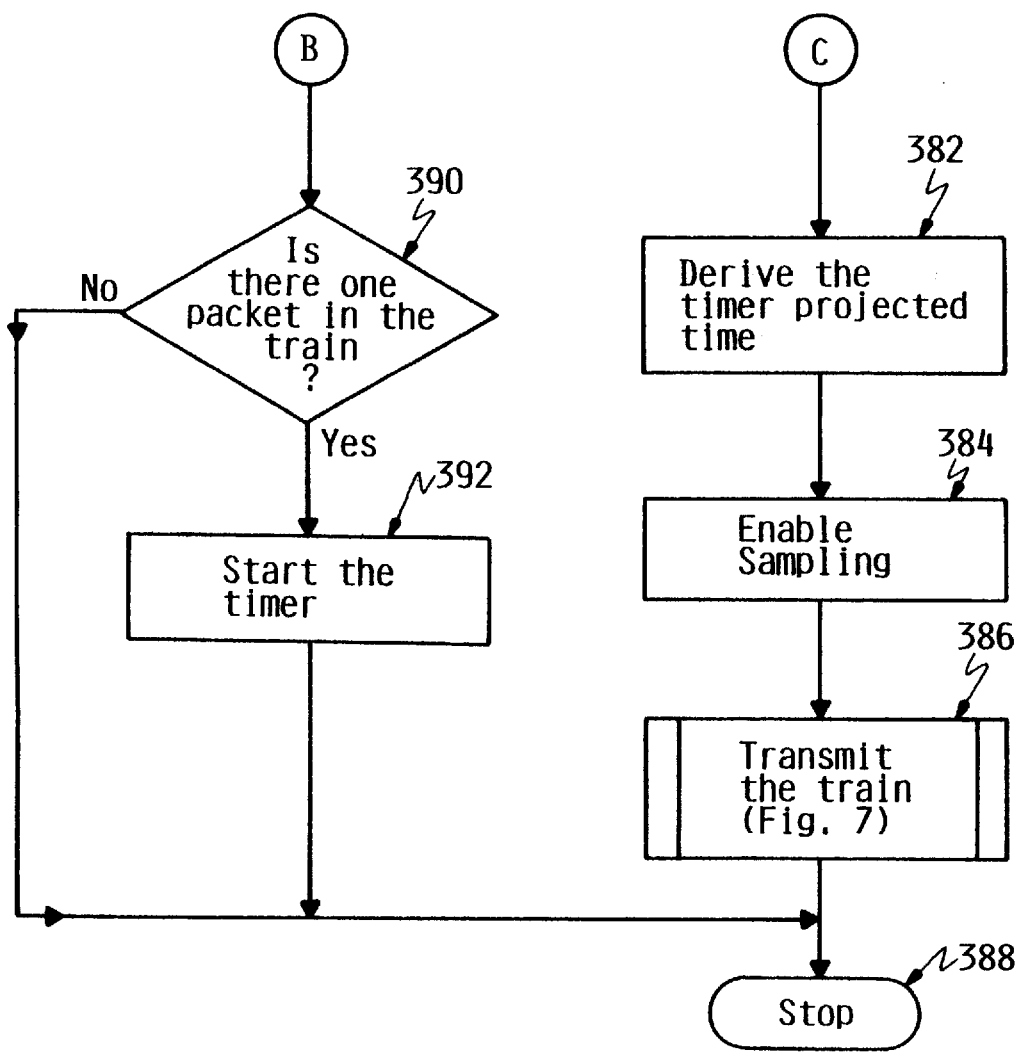

Referring to FIG. 6, the logic invoked when host packet control 119 receives a packet is shown. At block 350, the logic is started. At block 352, host packet control 119 checks whether the received packet will fit in the current train.

Figure 7:
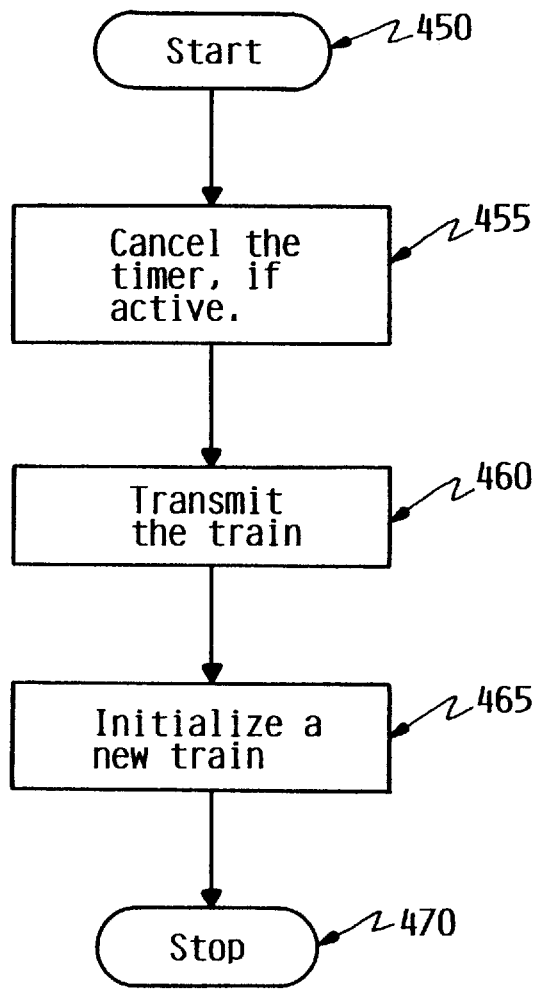

If the received packet will not fit in the current train, at block 354 host packet control 119 invokes the logic described at FIG. 7. Referring to FIG. 7, control starts at block 450. At block 455, host packet control 119 cancels the timer if it is active. At block 460, host packet control 119 transmits the current train. At block 465, host packet control 119 ends the current train and starts a new current train. At block 470 the logic returns to FIG. 6.

Referring back to FIG. 6, flow continues to block 356 regardless of the outcome of the check at block 352. At block 356 host packet control 119 adds the received packet to the current train.

At block 358, host packet control 119 checks whether the train is full. If the train is full, host packet control 119 transmits the train, as further described in FIG. 7 before ending at block 362.

If the train is not full, at block 364, host packet control 119 checks whether the received packet is the first packet in the train. If the received packet is the first packet in the train, at block 366 host packet control 119 saves the current time from timer 121, which represents the time the train started. Flow continues to block 368.

At block 368, host packet control 119 checks whether it needs to sample the optimum train length to determine if it should be adjusted in order to accommodate a changing packet traffic load. The sample semaphore increases performance by only doing the expensive overhead associated with increasing the optimum packet length after a train is transmitted because it reached its packet limit. If sampling is needed, at block 370 host packet control 119 gets the current time from timer 121, and flow continues to block 372. If the current time is less than the projected time at block 372, host packet control 119 increases the optimum packets per train at block 374. In the preferred embodiment, the optimum packets per train is incremented by one, although any amount appropriate for performance tuning could be used. Flow continues to block 376, where host packet control 119 disables sampling. Flow continues to block 380.

At block 380, host packet control 119 checks whether the train has reached its optimum length.

If the train has reached its optimum length, at block 382 host packet control 119 derives the projected time that the timer would have eventually expired for this train had the optimum train length not been reached. This can be calculated by adding the time that the train started to the timer interval. At block 384, host packet control 119 enables sampling. At block 386, host packet control 119 ends the current train as further described in FIG. 7. Host packet control 119 then ends at block 388.

If the train has not reached its optimum length, at block 390 host packet control 119 checks whether the number of packets in the train is one. If the number of packets in the train is one, then at block 392 host packet control 119 sets timer 121 to expire at a timer interval, which is a predetermined constant. Flow continues to block 388 where host packet control 119 ends.

Figure 8:
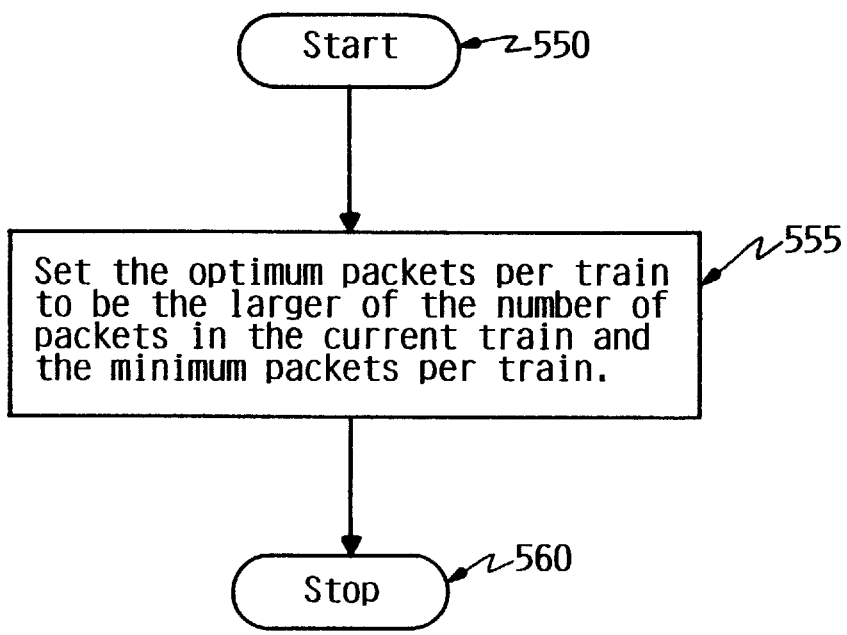

FIG. 8 shows the logic of host packet control 119 that is invoked when timer 121 expires. The logic is entered at block 550. At block 555, host packet control 119 sets the optimum packets per train to be the larger of the number of packets in the current train and the minimum packets per train. The minimum packets per train is a predetermined constant appropriate for performance tuning. In the preferred embodiment the minimum packets per train is one. The minimum packets per train could also be greater than one and less than the maximum packets per train. At block 560, host packet control 119 ends.

Figure 9:
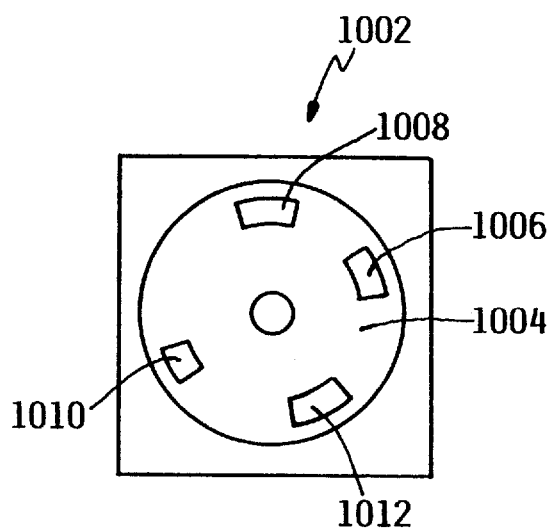
FIG. 9 depicts a block diagram of an article of manufacture or a computer program product including a storage medium for storing thereon program means for carrying out the host packet control program, according to the preferred embodiment.

FIG. 9 shows an article of manufacture or a computer program product including a storage medium for storing thereon program means for carrying out the method of this invention in the node of FIG. 2. It is important to note that while the present invention has been described in the context of a computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communications links.

An example of such an article of manufacture is illustrated in FIG. 9 as pre-recorded floppy disk 1002. Floppy disk 1002 is intended for use with a data processing system, and includes magnetic storage medium 1004, and program means 1006, 1008, 1010, and 1012 recorded thereon, for directing processing program 110 to facilitate the practice of the method of this invention. It will be understood that such apparatus and articles of manufacture also fall within the spirit and scope of this invention.

These foregoing concepts are illustrated by the following pseudo-code. The following configurable constants are used.

maxDataPerTrain: Maximum amount of data per train, which in the preferred embodiment is larger than the maximum packet length.
minPacketsPerTrain: Minimum number of packets per train.
maxPacketsPerTrain: Maximum number of packets per train.
minPacketSize: Minimum size of packet.
t: Timer interval that the timer is set to.
dT: When subtracted from the timer interval, t, dT produces a realistic goal to optimize to. dT thus keeps the mechanism from creeping too close to the timer interval, and thus helps to avoid timer expiration due to system loading. It has the added benefit of helping to avoid continual creep into timer expiration due to the inherent nature of the pseudo code to increment the number of packets in each train.

The following variables are used by the pseudo code:
n: Dynamically adjustable optimum number of packets per train.
Ts: Time at start of train.
Te: Projected ending time.
sample: Boolean flag indicating whether arrival sampling is required.
train: The object implementing the actual packet train.

```
Psuedo-code:
! Initialize the packet delivery support
initPacketDelivery;
    n=maxPacketsPerTrain-1;    ! Go for throughput first
    sample=FALSE;              ! Disable sampling
    train.new();               ! Initialize a new train
end initPacketDelivery;
! Deliver existing train and start a new one
newTrain();
    cancelTimer();             ! Cancel deadman timer, if active
    train.transmit();          ! Transmit the train
    train.new();               ! Initialize a new train
end newTrain;
! Deadman timer function, entered upon deadman timer expiration
deadManTimer();
    ! Adjust n to packets per this interval t
    n=max(train.numberPackets(),minPacketsPerTrain);
    newTrain();                ! Deliver the existing train
end deadManTimer;
! Packet delivery function
newPacket(p);
    ! Will packet fit in this train?
    if maxDataPerTrain - train.dataSize()<p.dataSize()
    then                       ! No, transmit to avoid reordering data
        newTrain();
train.addToTrain(p);           ! Add packet to train
! Has this train reached it's maximum capacity?
if train.numberPackets()=maxPacketsPerTrain
    (maxDataPerTrain-train.dataSize())<minPacketSize
then                           ! Yes, so time for transmission
    newTrain();
else                    ! No, so n may not be optimal
    do;
    ! Is this the first packet in this train?
    if train.numberPackets()=1
    then                       ! Yes, so remember starting time
    getTime(Ts);
if sample         ! Need to sample the current packet arrival time?
then              ! Yes, so determine if arrival frequency is increasing
    do;
    getTime(currentTime);
    if currentTime<Te    ! Ok to increase packet limit?
    then                 ! Yes, so do it now
```

```
        n=n+1;
        sample=FALSE;          ! Disable sampling
    end;
    if train.numberPackets()=n  ! Has the train reached the current packet limit?
    then                   ! Yes, so force transmission
        do;
        Te=Ts+(t-dT);      ! Derive the timer expiration time
        sample=TRUE;       ! Force a sampling
        newTrain();
            end;
    ! Need to start a timer?
    else
        if train.numberPackets()=1
        then    ! Yes, so do it now
            setTimer(deadManTimer(),t);
    end;
end newPacket;
```

While this invention has been described with respect to the preferred and alternative embodiments, it will be understood by those skilled in the all that various changes in detail may be made therein without departing from the spirit, scope, and teaching of the invention. For example, although in the preferred embodiment, packet training is performed between host 103 (acting as a node), and communications packet control 106 in communications controller 101 (acting as a node), it is also possible that packet training could be performed between system 100 (acting as a node) and other systems in network 18, such as nodes 12, 28, 30, and 38. Accordingly, the herein disclosed invention is to be limited only as specified in the following claims.

What is claimed is:

1. At one node in a plurality of nodes, a method for packet training between the nodes, comprising the steps of:
   starting a timer to expire at a predetermined maximum time to wait;
   counting the number of packets accumulated at the node; and
   dynamically adjusting the number of packets transmitted from the node in a train based on the number of packets accumulated at the node, an adjustable optimum train length, and the timer, wherein the dynamic adjusting step further comprises when the timer expires, transmitting the accumulated packets in the train and setting the optimum train length to be the greater of the number of packets accumulated in the train and a minimum number of packets per train, wherein the minimum number of packets per train is a predetermined constant.

2. The method of claim 1, wherein the dynamic adjusting step further comprises:
   when the timer expires, transmitting the accumulated packets in the train and setting the optimum train length to be the number of packets accumulated in the train.

3. The method of claim 1, wherein the dynamic adjusting step further comprises:
   when the number of packets accumulated equals the optimum train length and the timer has not expired, canceling the timer, transmitting the accumulated packets, and saving the time that the timer would have expired had the timer not been canceled; and
   when a next packet arrives before the saved time, incrementing the optimum train length by an increment constant.

4. The method of claim 3, wherein the increment constant is one.

5. The method of claim 1 wherein the adjustable optimum train length is initialized to provide packet throughput as an initial goal.

6. The method of claim 1 wherein the adjustable optimum train length is initialized to provide packet response time as an initial goal.

7. The method of claim 5 wherein the adjustable optimum train length is initialized to be a maximum number of packets in a train minus one.

8. The method of claim 6 wherein the adjustable optimum train length is initialized to be one.

9. An apparatus for packet training between the nodes, comprising:

means for starting a timer to expire at a predetermined maximum time to wait;

means counting the number of packets accumulated at the node; and means for dynamically adjusting the number of packets transmitted from the node in a train based on the number of packets accumulated at the node, an adjustable optimum train length, and the timer, wherein the dynamic adjusting means further comprises means, when the timer expires, for transmitting the accumulated packets in the train and setting the optimum train length to be the greater of the number of packets accumulated in the train and a minimum number of packets per train, wherein the minimum number of packets per train is a predetermined constant.

10. The apparatus of claim 9, wherein the dynamic adjusting means further comprises:

means, when the timer expires, for transmitting the accumulated packets in the train and setting the optimum train length to be the number of packets accumulated in the train.

11. The apparatus of claim 9, wherein the dynamic adjusting means further comprises:

means, when the number of packets accumulated equals the optimum train length and the timer has not expired, for canceling the timer, transmitting the accumulated packets, and saving the time that the timer would have expired had the timer not been canceled; and means, when a next packet arrives before the saved time, for incrementing the optimum train length by an increment constant.

12. The apparatus of claim 11, wherein the increment constant is one.

13. The apparatus of claim 9 wherein the adjustable optimum train length is initialized to be the maximum number of packets in a train minus one.

14. A program product for use in a computer system, the computer program product being adapted for packet training between nodes, the computer program product comprising:

a recording medium;

means, recorded on the recording medium, for starting a timer to expire at a predetermined maximum time to wait;

means, recorded on the recording medium, for counting the number of packets accumulated at the node; and means, recorded on the recording medium, for dynamically adjusting the number of packets transmitted from the node in a train based on the number of packets accumulated at the node, an adjustable optimum train length, and the timers, wherein the dynamic adjusting means further comprises means, when the timer expires, for transmitting the accumulated packets in the train and setting the optimum train length to be the greater of the number of packets accumulated in the train and a minimum number of packets per train, wherein the minimum number of packets per train is a predetermined constant.

15. The apparatus of claim 14, wherein the dynamic adjusting means further comprises:

means, recorded on the recording medium, when the timer expires, for transmitting the accumulated packets in the train and setting the optimum train length to be the number of packets accumulated in the train.

16. The apparatus of claim 14, wherein the dynamic adjusting means further comprises:

means, recorded on the recording medium, when the number of packets accumulated equals the optimum train length and the timer has not expired, for canceling the timer, transmitting the accumulated packets, and saving the time that the timer would have expired had the timer not been canceled; and means, recorded on the recording medium, when a next packet arrives before the saved time, for incrementing the optimum train length by an increment constant.

17. The apparatus of claim 16, wherein the increment constant is one.

18. The apparatus of claim 14 wherein the adjustable optimum train length is initialized to be the maximum number of packets in a train minus one.

* * * * *